United States Patent
Steindl et al.

(10) Patent No.: US 6,805,022 B1
(45) Date of Patent: Oct. 19, 2004

(54) ACCELERATOR PEDAL MODULE

(75) Inventors: Sandra Steindl, Buehlertal (DE); Sven Wolfgarten, Offenburg (DE); Mario Huesges, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,152

(22) PCT Filed: Aug. 18, 2000

(86) PCT No.: PCT/DE00/02830

§ 371 (c)(1),
(2), (4) Date: Oct. 22, 2001

(87) PCT Pub. No.: WO01/14161

PCT Pub. Date: Mar. 1, 2001

(30) Foreign Application Priority Data

Aug. 21, 1999 (DE) .......................... 199 39 809

(51) Int. Cl.[7] ................................. G05G 1/14
(52) U.S. Cl. ................ 74/513; 74/512; 74/514; 74/560; 73/1.75
(58) Field of Search ............. 74/512–514, 560; 73/1.75

(56) References Cited

U.S. PATENT DOCUMENTS

| 3,151,499 | A | | 10/1964 | Roe |
|---|---|---|---|---|
| 3,448,634 | A | | 6/1969 | Eggers et al. |
| 4,454,497 | A | * | 6/1984 | Morse ..................... 340/52 R |
| 5,507,201 | A | * | 4/1996 | Fairbairn et al. ............. 74/513 |
| 5,529,296 | A | | 6/1996 | Kato et al. |
| 5,868,040 | A | * | 2/1999 | Papenhagen et al. ......... 74/513 |
| 5,934,152 | A | * | 8/1999 | Aschoff et al. ............... 74/513 |
| 2002/0002873 | A1 | * | 1/2002 | Yaddehige .................. 74/512 |
| 2002/0152831 | A1 | * | 10/2002 | Sakamoto et al. ............ 74/512 |
| 2003/0019278 | A1 | * | 1/2003 | Kato et al. .................... 73/1.75 |

FOREIGN PATENT DOCUMENTS

| DE | 931560 | | 8/1955 | |
| DE | 43 37 679 A | | 5/1994 | |
| DE | 19500666 A1 | * | 7/1996 | .................. 74/513 |
| DE | 195 05 374 A | | 8/1996 | |
| DE | 19505374 | | 8/1996 | |
| DE | 195 36 606 A | | 4/1997 | |
| DE | 19939810 A1 | * | 2/2001 | .................. 74/513 |

* cited by examiner

*Primary Examiner*—Vinh T. Luong
(74) *Attorney, Agent, or Firm*—Ronald E. Greigg

(57) ABSTRACT

An accelerator pedal module for controlling the power of a driving machine of a motor vehicle in which a two-point calibration is effected, so that the idle travel distances can be selected as substantially shorter than in the accelerator pedal module known before. In particular, it is proposed that first the sensor be calibrated in the position of repose, and then the so-called kick-down angle position of the pedal lever is set via a set screw.

4 Claims, 4 Drawing Sheets

ACCELERATOR PEDAL MODULE

CROSS-REFERENCE TO RELATED APPLICATIONS

This application is a 35 USC 371 application of PCT/DE 00/02830 filed on Aug. 18, 2000.

BACKGROUND OF THE INVENTION

1. Field of the Invention

The invention is directed to an accelerator pedal module for controlling the power to a motor or engine, and more particularly to such an accelerator pedal having a two-point calibration.

2. Description of the Prior Art

For controlling the power of a driving machine of a motor vehicle, the demands of the motor vehicle driver are transmitted to the driving machine from a pedal lever, disposed within range of the motor vehicle driver, by means of electric lines and via a controller. To that end, a sensor is provided that measures the position of the pedal lever. Measured values from the sensor, after suitable processing, are transmitted to the driving machine by the controller. A kick-down mechanism and an electric switch are often provided as well.

The sensor of the accelerator pedal module is intended, at a certain position of the pedal lever, to furnish an electrical signal at a precisely predetermined level. To that end, the sensor is adapted in a certain position of the pedal lever. In the accelerator pedal module shown in International Patent Disclosure WO97/12781 and in German Patent Disclosure DE 195 36 606 A1, this is done by rotating the sensor housing, in a certain position of the pedal lever, far enough that the electrical signal output by the sensor is located within a predetermined, narrow tolerance band. Upon an actuation of the pedal lever, the electrical signal output by the sensor then changes, so that the controller can detect the position of the pedal lever at that time.

Upon an actuation of the pedal lever between the position of repose of the pedal lever and the end position of the pedal lever, there is a so-called kick-down angle position, in which the restoring force exerted on the pedal lever rises abruptly. The kick-down angle position is located shortly before the end position of the pedal lever. An electric switch is provided on the accelerator pedal module. The electric switch typically serves to switch over a gear of the motor vehicle. The electric switch is switched over by the pedal lever whenever the pedal lever is located between the kick-down angle position and the end position.

Because the slope of the electrical signal output by the sensor is unavoidably affected by tolerances as a function of the angle position of the pedal lever, and because the switching point of the electric switch is also not entirely free of tolerance, and since furthermore the mechanism of the accelerator pedal module has tolerances with regard to the attainable angle positions, the switching path between the kick-down angle position and the angle position at which the electric switch switches over, must be relatively long, in the known accelerator pedal module. The kick-down switching path between the kick-down angle position and the end position of the pedal lever is also fairly long in the known accelerator pedal module, for the tolerance reasons given. Another disadvantage is that because of tolerances, the fact that the electrical signal of the sensor upon reaching the kick-down angle position is relatively widely scattered must be accepted into the bargain.

As a result, the paths for actuating the pedal lever must be kept relatively long overall, and the scattering of the electrical signal of the sensor in the kick-down angle position must be taken into account by suitable design of the electric controller, for instance by means of a suitable control unit.

SUMMARY OF THE INVENTION

The accelerator pedal module embodied according to the invention has the advantage over the prior art that, largely independently of production-dictated tolerances in the electrical signal of the sensor, a very precise electrical signal of the sensor can be attained that is dependent on the particular position of the pedal lever at the time. In particular, it can be attained that in both the position of repose of the pedal lever and the kick-down angle position of the pedal lever, the electrical signal of the sensor is within very close tolerances. A further advantage is that the switching path between the kick-down angle position and the switchover of the electric switch can be kept desirably quite short, and the pivot angle between the kick-down angle position of the pedal lever and the end position of the pedal lever can also be kept fairly short. As a result, the advantage is obtained that the driver operating the pedal lever has the feeling of precise control of the power of the driving machine between the position of repose of the pedal lever and the kick-down angle position of the pedal lever, and the switching path and the pivot angle between the kick-down angle position and the end position of the pedal lever can be kept fairly short. A long switching path and a long pivot angle between the kick-down angle position and the end position would in fact be perceived as a fairly unpleasant idle travel by the driver. Since only short idle travel distances for the pedal lever overall are required, the advantage is obtained that the accelerator pedal module can be made relatively small in size overall, and that the available installation space in the passenger compartment for actuating the pedal lever is fairly small.

BRIEF DESCRIPTION OF THE DRAWINGS

The foregoing and other features and advantages of the invention will be apparent from the description contained below, taken with the drawings, in which.

DESCRIPTION OF THE PREFERRED EMBODIMENTS

The accelerator pedal module embodied according to the invention can be used to control various driving machines. By way of example, the driving machine is an Otto engine, whose throttle valve is adjusted with a control motor. In that case, the accelerator pedal module is used to output electrical signals, which are delivered to the control motor that adjusts the throttle valve. However, by way of example, the driving machine can also be a Diesel engine or an electric motor, and in these cases as well, electrical signals originate at the accelerator pedal module and, suitably reshaped, control the power of the driving machine.

The accelerator pedal module is preferably secured to a vehicle part of the motor vehicle directly within action range of the motor vehicle driver. The pedal lever of the accelerator pedal module is often also called a gas pedal.

Figure 1:
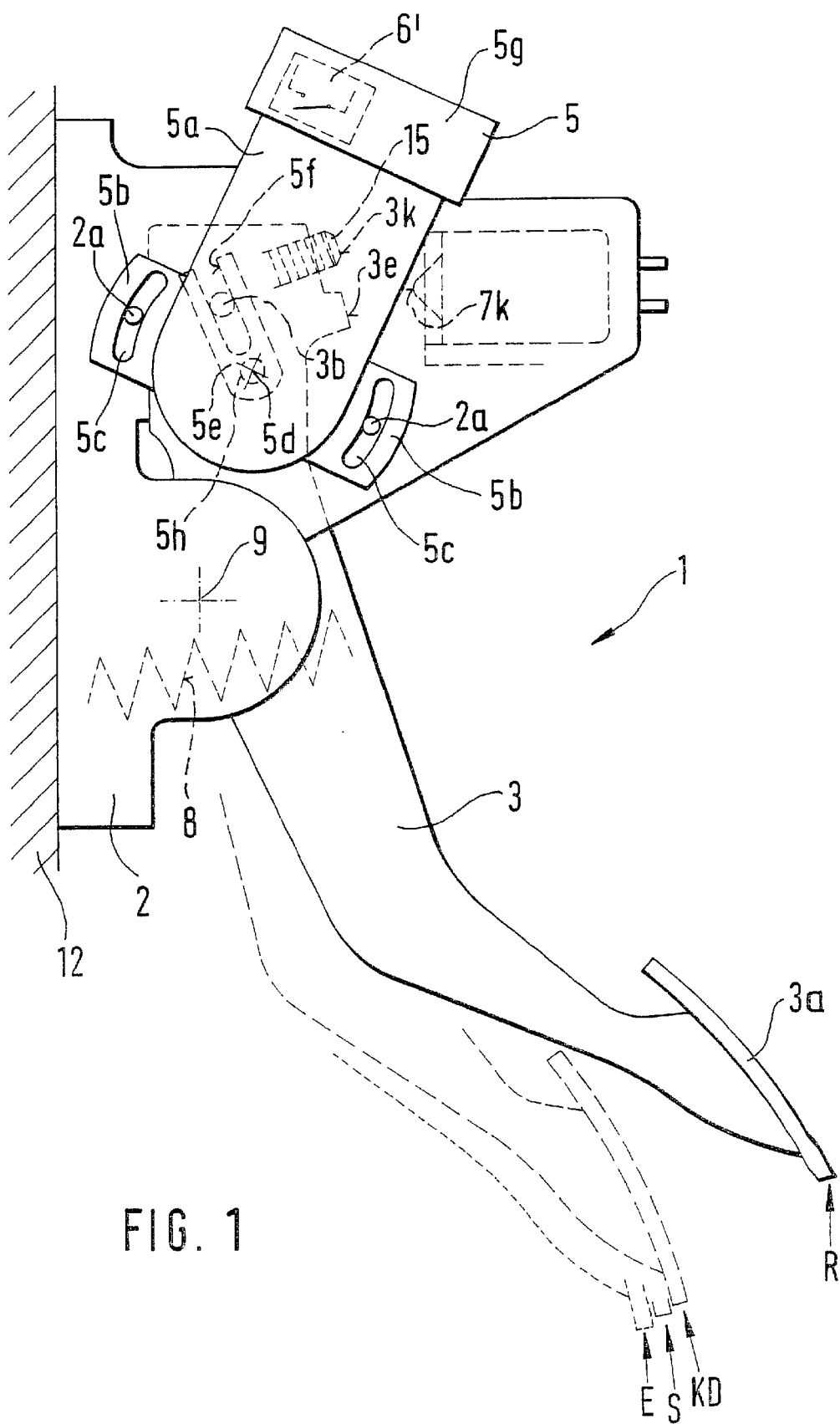
FIG. 1 shows a side view of a first exemplary embodiment of an accelerator pedal module.
Figure 2:
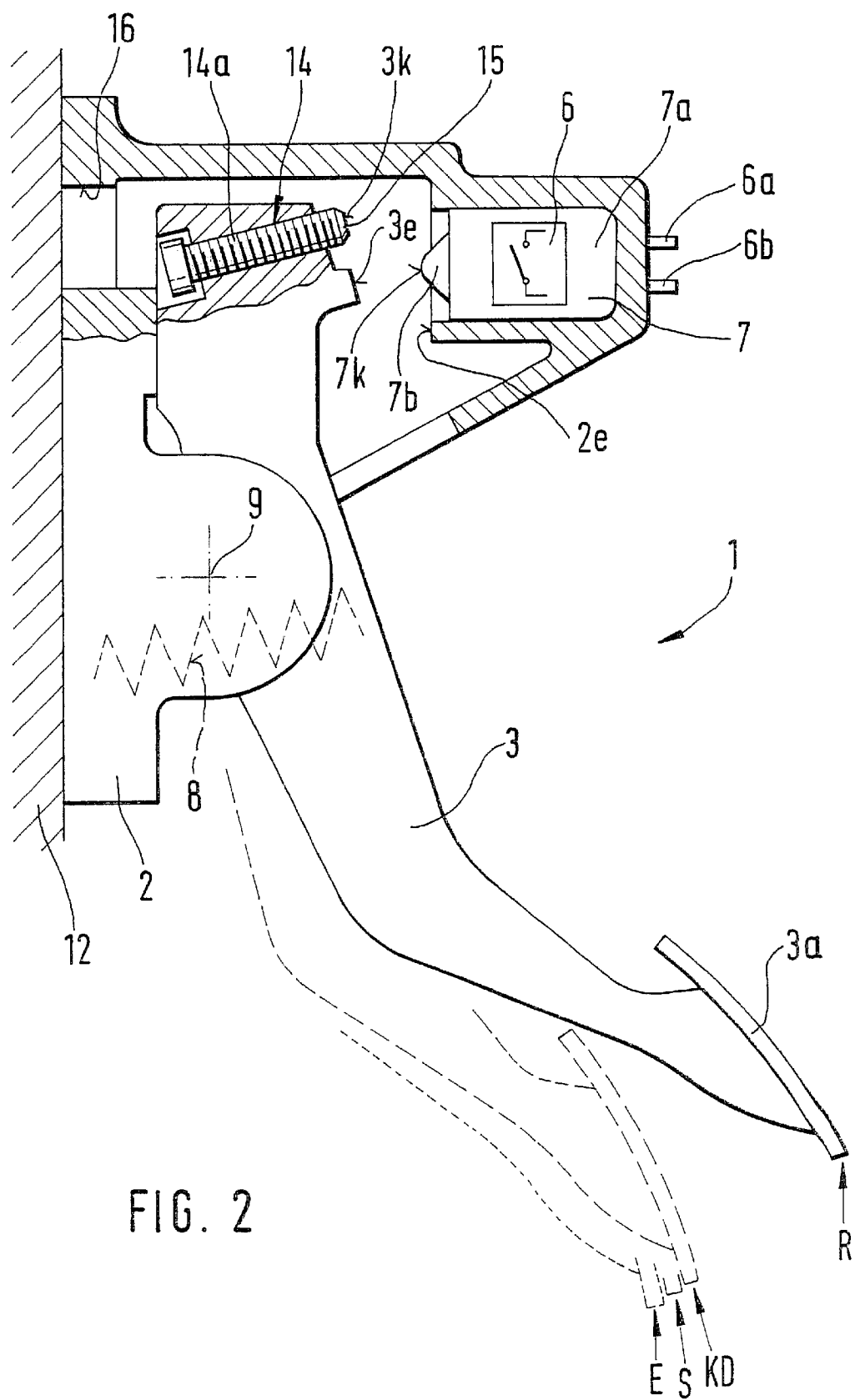
FIG. 2, partly in section, is a side view of the first exemplary embodiment with the sensor removed.

FIGS. 1 and 2 show a side view of a preferably selected, especially advantageous exemplary embodiment; in FIG. 2, for the sake of greater simplicity, the sensor has been left out, and both the retaining structure that serves as a housing and the pedal lever of the accelerator pedal module are shown partly in section.

In all the drawings, identical or identically functioning parts are identified by the same reference numerals. Unless otherwise noted or shown in the drawing, what is said and shown in conjunction with one of the drawing figures applies to the other exemplary embodiments as well. Unless otherwise stated in the explanation, details of the various exemplary embodiments can be combined with one another.

FIGS. 1 and 2 show an accelerator pedal module including a retaining structure 2, a pedal lever 3, a sensor 5, an electric switch 6, a kick-down mechanism 7, a restoring spring assembly 8, and a pivot bearing 9.

The retaining structure 2 is preferably secured directly in the range of the foot of a motor vehicle driver to a vehicle part 12 of a motor vehicle, shown symbolically by shading in the drawings. The pedal lever 3 is preferably actuated directly by the driver's foot. However, it is also possible to connect a separate gas pedal pivotably to the pedal lever 3 via a simple rod linkage.

The retaining structure 2 carries the pedal lever 3. Via the pivot bearing 9, the pedal lever 3 is supported pivotably relative to the retaining structure 2. The sensor 5 senses the position of the pedal lever 3 at any given time and furnishes an electrical signal, corresponding to the position of the pedal lever 3, to a controller, not shown, via electric lines, also not shown in drawing.

The pedal lever 3 is adjustable between position of repose R and an end position E. Between the position of repose R and the end position E, there is a kick-down angle position KD. The pedal lever 3 reaches the kick-down angle position KD shortly before it reaches its end position E. Between the kick-down angle position KD and the end position E, there is also a particular, definable switching position S.

The electric switch 6 shown symbolically in FIG. 2 is integrated with the kick-down mechanism 7. In the structurally definable switching position S of the pedal lever 3, the electric switch 6 generates a signal to the controller, not shown, via the terminal pins 6a and 6b leading out of the kick-down mechanism 7 and via an electric line, not shown. By way of example, the switch 6 is a so-called opener or a so-called closer.

If the pedal lever 3 is not actuated, then the restoring spring assembly 8 puts the pedal lever 3 in the position of repose R. If sufficiently great force is exerted on a pedal plate 3a provided at the end of the pedal lever 3, then the pedal lever 3 can be adjusted counter to the restoring force of the restoring spring assembly 8 as far as the end position E.

The drawings show the pedal lever 3 in its position of repose R in solid lines. Part of the pedal lever 3 is also shown in dashed lines in the kick-down angle position KD; short dashed lines also indicate the end position E of the pedal lever 3, and the lower end of the pedal plate 3a is also furthermore shown symbolically, while the pedal lever 3 is in the switching position S. For the sake of greater simplicity, the pedal lever 3 is shown only in part in the kick-down angle position KD, the switching position S, and the end position E. An arrow marked R points to the lower end, in the position of repose R, of the pedal plate 3a; an arrow marked KD points to the lower end, in the kick-down angle position KD, of the pedal plate 3a; an arrow marked S points to the lower end, in the switching position S, of the pedal plate 3a; and an arrow marked E points to the lower end, in the end position E, of the pedal plate 3a.

The sensor 5 is flanged to the retaining structure 2, which acts as a housing or as a bearing block. The sensor 5 has a sensor housing 5a, onto which two laterally protruding flanges 5b are formed. One oblong slot 5c is provided in each of the flanges 5b. The sensor 5 is built onto the retaining structure 2 in such a way that the sensor 5 is rotatable about a sensor lever pivot axis 5d relative to the retaining structure 2. To that end, a cylindrical protrusion is formed, for instance onto the sensor housing 5a, concentrically to the sensor lever pivot axis 5d, and the protrusion engages a cylindrical bore provided in the retaining structure 2. The sensor lever pivot axis 5d extends perpendicular to the plane of the drawing in FIGS. 1 and 2; in FIG. 1, the sensor lever pivot axis 5d is indicated in symbolic form as an intersection point of two short lines perpendicular to one another. The sensor 5 has a sensor shaft 5h and a sensor lever 5e. The sensor shaft 5h extends concentrically to the sensor lever pivot axis 5d. The sensor shaft 5h penetrates the sensor housing 5a on the side of the sensor housing 5a that is remote from the side that is visible in FIG. 1. The sensor level 5e is secured in a manner fixed against relative rotation on the end of the sensor shaft 5h toward the pedal lever 3 and protruding out of the sensor housing 5a.

The sensor lever 5e has a recess 5f extending radially to the sensor lever pivot axis 5d. Upon rotation of the sensor lever 5e about the sensor lever pivot axis 5d, a wiper, for instance, inside the sensor 5 moves over a resistor path, and accordingly electrical signals that can be delivered to the controller, not shown, are obtained at a plug connection 5g of the sensor 5. A cylindrical pin 3b is fixedly mounted on the pedal lever 3, perpendicular to the plane of the drawing in FIG. 1, or in other words parallel to the pivot axis of the pivot bearing 9 and also parallel to the sensor lever pivot axis 5d. The pin 3b engages the recess 5f of the sensor 5. The diameter of the pin 3b of the pedal lever 3 is adapted to the width of the recess 5f of the sensor lever 5e in such a way that in the circumferential direction to the sensor lever pivot axis 5d, a connection between the pin 3b and the sensor lever 5e that is virtually play-free is assured.

Upon an actuation of the pedal lever 3, the pin 3b of the pedal lever 3 moves about the pivot axis of the pivot bearing 9. Since the pedal lever 3, via the pin 3b, is in engagement with the sensor lever 5e of the sensor 5, an actuation of the pedal lever 3 leads to a correspondingly stepped-up pivoting motion of the sensor lever 5e about the sensor lever pivot axis 5d, which in turn causes a corresponding change in the electrical signal of the sensor 5.

While the sensor lever 5e is in engagement with the pedal lever 3 via the pin 3b, the entire sensor housing 5a can be pivoted about the sensor lever pivot axis 5d. The result is a rotational guidance of the sensor housing 5a relative to the retaining structure 2, via the protrusion that is formed onto the sensor housing 5a and engages the cylindrical bore provided in the retaining structure 2. By means of rotating the sensor housing 5a, calibration of the sensor 5 can be done. The sensor 5 can be rotated about the sensor lever pivot axis 5d so far that the desired, predetermined electrical signal corresponding to the position of the pedal lever 3 at the time is output at the plug connection 5g of the sensor 5.

Two plastic pins 2a are formed onto the retaining structure 2. The pins 2a protrude through the oblong slots 5c of the sensor 5. The oblong slots 5c extend concentrically to the sensor lever pivot axis 5d. For calibration of the sensor 5, the sensor housing 5a can be rotated about the sensor lever pivot axis 5d so far that the pins 2a of the retaining structure 2 abut the ends of the oblong slots 5c of the sensor 5. This calibration takes place while the pedal lever 3 is in a first angle position. In the first angle position, the sensor 5 is calibrated, by rotation of the sensor housing 5a, in such a way that the signal output by the sensor 5 corresponds to a desired, predeterminable, first electrical setting signal.

It is proposed that the nonactuated position of repose R of the pedal lever 3 be provided as the first angle position for setting the first electrical setting signal.

After the calibration of the first electrical setting signal of the sensor 5, the pins 2a are deformed, by axial pressure and optionally by supplying heat, far enough that a permanent, immovable clamping connection is created between the pins 2a of the retaining structure 2 and the flanges 5b of the sensor 5. This assures that whenever the pedal lever 3 is in the nonactuated position of repose R, the sensor 5 even after a long time in operation furnishes the desired electrical signal corresponding to the position of repose R.

The kick-down mechanism 7 has a housing 7a. Inside the housing 7a, there is an axially displaceable pin 7b that can be pressed in resiliently. On the face end of the pin 7b toward the pedal lever 3, a kick-down stop 7k is provided. There is a counterpart stop 3k on the pedal lever 3. The counterpart stop 3k forms an adjustable stop 15. An adjusting element 14 is provided on the pedal lever 3. To keep the production costs low, the adjusting element 14 is a set screw 14a that is screwed into the pedal lever 3. The counterpart stop 3k that in this exemplary embodiment forms the adjustable stop 15 is located on the end of the set screw 14a toward the kick-down stop 7k. As FIGS. 1 and 2 show, the kick-down stop 7k is associated, via the kick-down mechanism 7 and via the retaining structure 2, with the vehicle part 12 of the motor vehicle. Correspondingly, the adjustable stop 15 formed on the counterpart stop 3k is associated with the pivotable pedal lever 3.

On the retaining structure 2, there is an end stop 2e, and there is a counterpart end stop 3e on the pedal lever 3. Upon actuation of the pedal lever 3 until it reaches the end position E, the counterpart end stop 3e of the pedal lever 3 comes to rest on the end stop 2e of the retaining structure 2. As a result, the maximum actuatable pivot angle of the pedal lever 3 is limited, and the end position E is defined.

Upon an actuation of the pedal lever 3 beginning at the position of repose R, the adjustable stop 15 provided on the pedal lever 3 comes to rest, in an intermediate position, on the kick-down stop 7k. The angle position at which the adjustable stop 15 comes to rest on the kick-down stop 7k is called the kick-down angle position KD. If the pedal lever 3 is actuated farther, past the kick-down angle position KD, then the resiliently prestressed pin 7b is pressed into the housing 7a. As a result, when the kick-down angle position KD is exceeded, the restoring force acting on the pedal lever 3 rises abruptly.

Beginning at the position of repose R, the pedal lever 3 passes through the kick-down angle position KD and then the switching position S to reach the end position E. For reasons of comfort and because of the required installation space, the pivot angle between the kick-down angle position KD and the end position E should be as small as possible, and assurance should also be provided that the electrically usable range of the sensor 5 can in fact also be fully exploited. Since the pivot angle between the kick-down angle position KD and the end position E, and thus also the pivot angle between the switching position S and the end position E, should be quite small, it is proposed that a calibration be performed in two positions of the pedal lever 3. Besides the calibration in the first angle position to the first electrical setting signal, the accelerator pedal module 1 is also calibrated in a second angle position of the pedal lever 3 to a desired, predetermined, second electrical setting signal.

The setting of the predeterminable second electrical setting signal is preferably done whenever the pedal lever 3 is in its kick-down angle position KD. During the setting of the second electrical setting signal, the pedal lever 3 is acted upon by a force that suffices to keep the counterpart stop 3k, and hence the adjustable stop 15, of the pedal lever 3 in contact with the kick-down stop 7k, but without pressing the pin 7b inward. To set the second electrical setting signal, the set screw 14a is turned. When the set screw 14a is turned, the entire pedal lever 3 is adjusted, while the adjustable stop 15 contacts the kick-down stop 7k. This pivoting motion of the pedal lever 3, caused by the turning of the set screw 14a, leads to a corresponding slight adjustment of the sensor lever 5e of the sensor 5, and thus to a corresponding change in the electrical signal furnished by the sensor 5. Thus by turning the set screw 14a acting as an adjusting element 14, the desired second electrical setting signal can be calibrated.

On the side of the retaining structure 2 toward the vehicle part 12, an opening 16 is provided. The opening 16 makes it possible for the adjusting element 14 to be set even after the accelerator pedal module 1 has been fully assembled. Making the opening 16 on the side of the retaining structure 2 toward the vehicle part 12 has the advantage that after the accelerator pedal module 1 has been mounted on the vehicle part 12, the opening 16 is no longer accessible, and accordingly unintentional adjustment of the adjusting element 14 is reliably prevented.

As the preferably selected exemplary embodiment described in conjunction with the drawings shows, it is proposed that a first electrical setting signal and in addition a predeterminable second electrical setting signal be calibrated. It is especially proposed that the first electrical setting signal be set while the pedal lever 3 is in its unactuated position of repose R. It is further proposed that the predeterminable second electrical setting signal be set while the pedal lever 3 is in the kick-down angle position KD. The double calibration can be done especially simply and without major engineering effort or expense by providing that the first electrical setting signal is effected by pivoting the sensor 5 about the sensor lever pivot axis 5d, and the setting of the second electrical setting signal is done by calibrating the angular position of the pedal lever 3 in the kick-down angle position KD such that in the kick-down angle position KD, the predeterminable electrical setting signal occurs, and this second setting takes place by way of the adjustable stop 15 provided between the pedal lever 3 and the retaining structure 2.

In the preferably selected exemplary embodiment, the electric switch 6 is integrated with the kick-down mechanism 7. Instead of the electric switch 6 in the kick-down mechanism 7, or in addition to the electric switch 6 in the kick-down mechanism 7, an electric switch 6' can selectively also be provided inside the sensor 5. The alternative switch 6' is shown symbolically by dashed lines in FIG. 1. The switch 6' in the sensor 5 is constructed such that when the pedal lever 3 is in the switching position S, the electric switch 6' provided in the sensor 5 switches over.

Depending on the type of motor vehicle and in particular on the embodiment of the electric controller, it is possible to dispense with both the switch 6 and the switch 6'. The electric controller can also be constructed such that when the pedal lever 3 is in the switching position S, the downstream controller sends a corresponding electrical switching signal to a component of the motor vehicle that is to be switched, doing so on the basis of electrical values output by the sensor 5 and ascertained for instance via the potentiometer built into the sensor 5.

Figure 3:
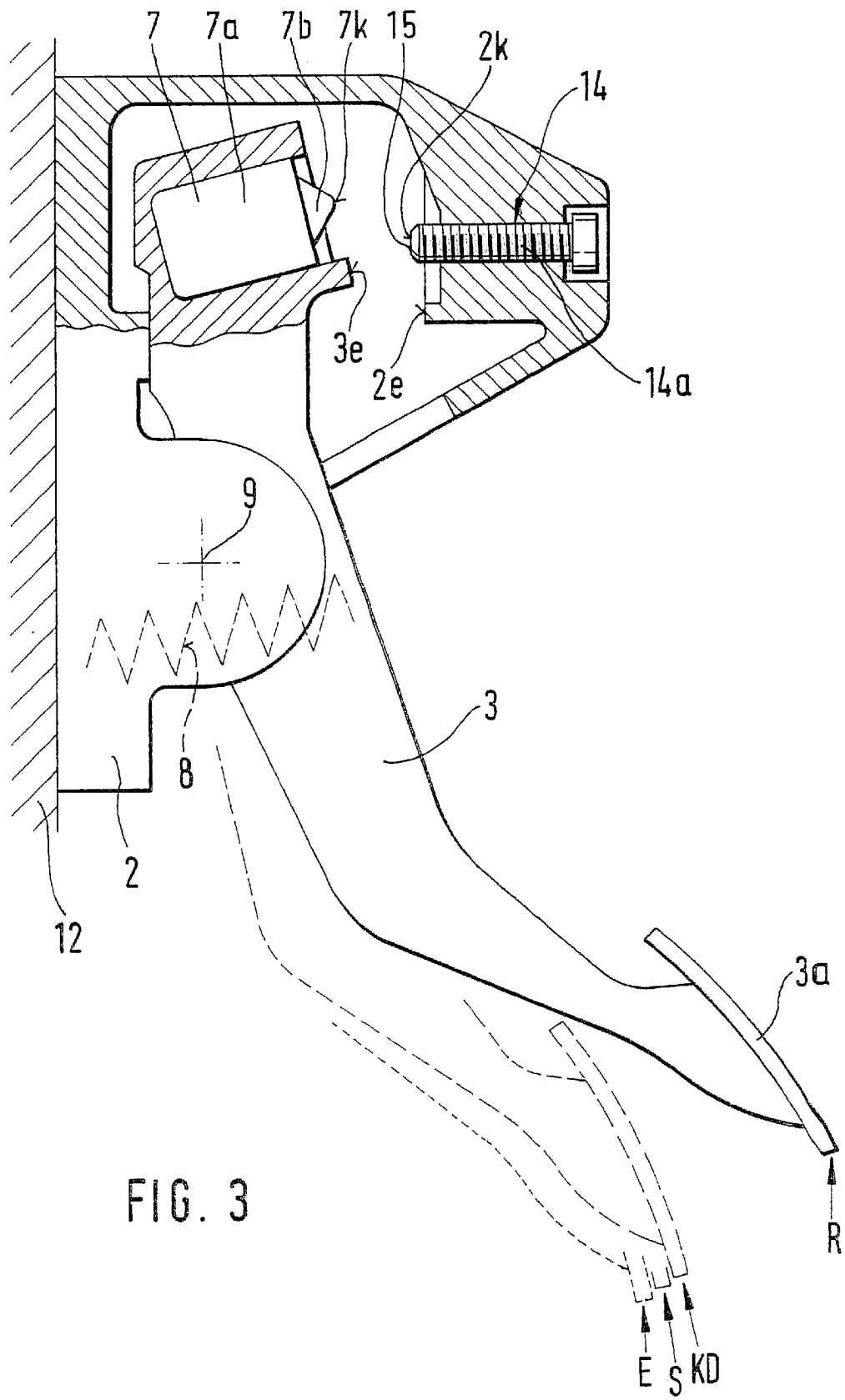
FIG. 3 and FIG. 4, partly in section, each show a side view, with the sensor removed, of two further exemplary embodiments of the accelerator pedal module.

FIG. 3 shows a further preferably selected, especially advantageous exemplary embodiment.

Since in the second exemplary embodiment the sensor 5 and the pivotable connection of the sensor 5 to the retaining structure 2 and to the pedal lever 3 are designed identically to the first exemplary embodiment, the sensor 5 has not been shown in FIG. 3 for the sake of greater simplicity in the second exemplary embodiment, and parts of the retaining structure 2 and of the pedal lever 3 are also shown in section for the sake of greater simplicity.

In the exemplary embodiment shown in FIG. 3, the housing 7a of the kick-down mechanism 7 is built into the pedal lever 3. Thus in this exemplary embodiment, the kick-down stop 7k is assigned to the pedal lever 3. The set screw 14a forming the adjusting element 14 is, in the exemplary embodiment shown in FIG. 3, screwed into the retaining structure 2. When the pedal lever 3 is in the kick-down angle position KD, then the kick-down stop 7k is located at the end of the set screw 14a. This end of the set screw 14a acts as a counterpart stop 2k for the kick-down stop 7k. In this exemplary embodiment, the adjustable stop 15 formed by the counterpart stop 2k is associated with the retaining structure 2 and thus with the vehicle part 12.

To avoid an electrical connection line that is constantly in motion, it is proposed that no electrical switch be provided in the kick-down mechanism 3 in the exemplary embodiment shown in FIG. 3, but that instead the electrical switch 6' be used in the sensor 5, as represented symbolically by dashed lines in FIG. 1.

Figure 4:
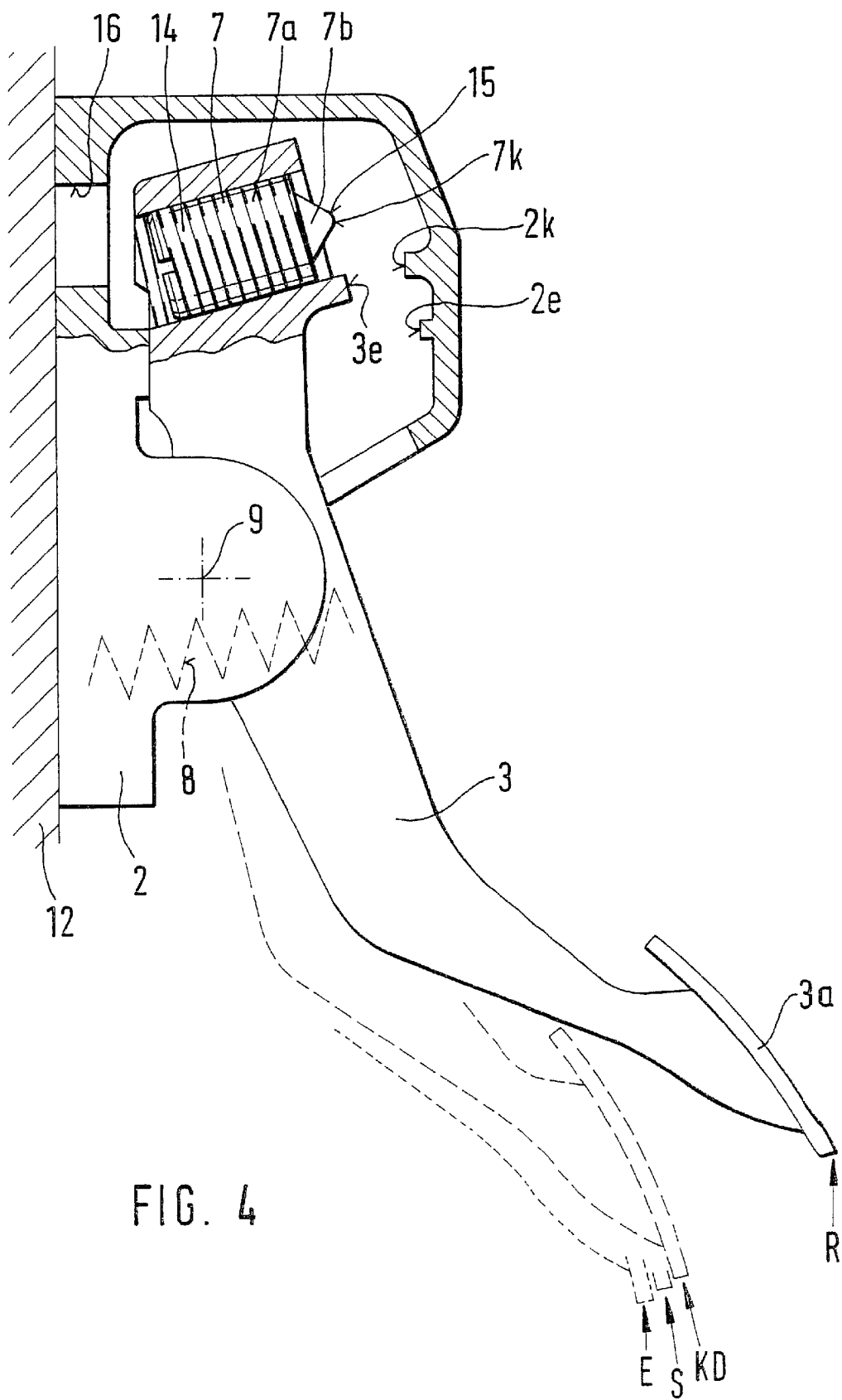

FIG. 4 shows a further preferably selected, especially advantageous exemplary embodiment.

It should be noted that the accelerator pedal module 1 can also be embodied in such a way that the set screw 14a is omitted, and instead a thread is provided, for instance on the circumference of the housing 7a of the kick-down mechanism 7, as shown in FIG. 4. The counterpart stop 2k is located directly on the retaining structure 2. In this modification, the kick-down mechanism 7 forms the adjusting element 14, and the adjustable stop 15 is located on the face end of the pin 7b of the kick-down mechanism 7. The calibration of the second electrical setting signal is done here while the pedal lever 3 is kept in the kick-down angle position KD, the calibration being effected by way of a rotation of the kick-down mechanism 7, which causes a displacement of the adjustable stop 15.

The foregoing relates to preferred exemplary of embodiments of the invention, it being understood that other variants and embodiments thereof are possible within the spirit and scope of the invention, the latter being defined by the appended claims.

What is claimed is:

1. An accelerator pedal module for controlling the power of a driving machine of a motor vehicle, the pedal module comprising a pedal lever (3), a pivot bearing (9) pivotally supporting said pedal lever on a retaining structure (2) adapted to be mounted on a vehicle part (12) of the vehicle, a sensor (5) for detecting the angle position of the pedal lever (3) and furnishing a corresponding electrical signal to a controller, and a restoring spring assembly (8) for restoring said pedal lever (3) to a position of repose (R) and having a kick-down mechanism (7), said pedal lever (3) being capable of being moved between said position of repose and a kick-down angle position (KD), said kick-down mechanism (7) generating a contrary force on said pedal lever (3) in the direction of the position of repose (R), when said pedal lever is in said kick-down position, the electrical signal of said sensor (5) is capable of being calibrated, whereby, in a first angle position of said pedal lever (3), said sensor (5) is calibrated in such a way that the electrical signal furnished by said sensor (5) corresponds to a desired first electrical setting signal, and a second angle position of said pedal lever (3) is settable, such that in said second angle position, the electrical signal furnished by said sensor (5) corresponds to a desired second electrical setting signal, wherein the setting of the second angle position of said pedal lever (3) is effected via a stop (15) provided between said pedal lever (3) and said retaining structure (2), the position of the stop (15) provided between said pedal lever (3) and said retaining structure (2) is adjustable, said kick-down mechanism (7) includes a kick-down stop (7k) which, in the kick-down angle position (KD) of said pedal lever (3), comes to rest on said stop (15), and wherein said kick-down mechanism (7) is fixedly secured, at least indirectly, on the vehicle part (12), said stop (15) being mounted on said pedal lever (3).

2. The accelerator pedal module of claim 1, wherein said kick-down mechanism (7) is secured to said retaining structure (2).

3. An accelerator pedal module for controlling the power of a driving machine of a motor vehicle, the pedal module comprising a pedal lever (3), a pivot bearing (9) pivotally supporting said pedal lever on a retaining structure (2) adapted to be mounted on a vehicle part (12) of the vehicle, a sensor (5) for detecting the angle position of the pedal lever (3) and furnishing a corresponding electrical signal to a controller, and a restoring spring assembly (8) for restoring said pedal lever (3) to a position of repose (R) and having a kick-down mechanism (7), said pedal lever (3) being capable of being moved between said position of repose and a kick-down angle position (KD), said kick-down mechanism (7) generating a contrary force on said Pedal lever (3) in the direction of the position of repose (R), when said pedal lever is in said kick-down position, the electrical signal of said sensor (5) is capable of being calibrated, whereby, in a first angle position of said pedal lever (3), said sensor (5) is calibrated in such a way that the electrical signal furnished by said sensor (5) corresponds to a desired first electrical setting signal, and a second angle position of said pedal lever (3) is settable, such that in said second angle position, the electrical signal furnished by said sensor (5) corresponds to a desired second electrical setting signal, wherein the setting of the second angle position of said pedal lever (3) is effected via a stop (15) provided between said pedal lever (3) and said retaining structure (2), the position of the stop (15) provided between said pedal lever (3) and said retaining structure (2) is adjustable, wherein said second angle position of the pedal lever (3) corresponds to the kick-down angle position (KD), and wherein said kick-down mechanism (7) is fixedly secured, at least indirectly, on the vehicle part (12), said stop (15) being mounted on said pedal lever (3).

4. The accelerator pedal module of claim 3, wherein said kick-down mechanism (7) is secured to said retaining structure (2).

* * * * *

UNITED STATES PATENT AND TRADEMARK OFFICE
CERTIFICATE OF CORRECTION

PATENT NO. : 6,805,022 B1
DATED : October 19, 2004
INVENTOR(S) : Sandra Huesges et al.

It is certified that error appears in the above-identified patent and that said Letters Patent is hereby corrected as shown below:

<u>Title page,</u>
Item [75], Inventors, should read as follows:

-- [75]   Inventors:   Sandra Huesges, Buehlertal (DE); Sven Wolfgarten, Offenburg (DE); Mario Huesges, Buehlertal (DE) --

Signed and Sealed this

Fifth Day of April, 2005

JON W. DUDAS
*Director of the United States Patent and Trademark Office*